US00RE37448B1

(19) United States
(12) Reissued Patent
Meixner et al.

(10) Patent Number: US RE37,448 E
(45) Date of Reissued Patent: Nov. 13, 2001

(54) EPOXY(METH)ACRYLATES, A PROCESS FOR THEIR PRODUCTION AND THEIR USE AS BINDERS

(75) Inventors: Juergen Meixner, Krefeld; Wolfgang Fischer, Meerbusch, both of (DE)

(73) Assignee: Bayer Aktiengesellschaft, Leverkusen (DE)

(21) Appl. No.: 09/521,490

(22) Filed: Mar. 8, 2000

Related U.S. Patent Documents

Reissue of:
(64) Patent No.: 5,726,255
Issued: Mar. 10, 1998
Appl. No.: 08/616,870
Filed: Mar. 15, 1996

(30) Foreign Application Priority Data

Mar. 24, 1995 (DE) ..... 195 10 766

(51) Int. Cl.[7] ..... C08F 20/00; C08F 283/00
(52) U.S. Cl. ..... 525/438; 525/531; 525/532; 525/533; 525/922
(58) Field of Search ..... 525/438, 531, 525/532, 533, 922

(56) References Cited

U.S. PATENT DOCUMENTS

| | | | | |
|---|---|---|---|---|
| 3,933,935 | | 1/1976 | Zachariades et al. | 260/836 |
| 4,014,771 | * | 3/1977 | Rosenkranz et al. | 204/159.23 |
| 4,187,257 | * | 2/1980 | Nielsen | 525/529 |
| 4,253,918 | * | 3/1981 | Traenckner et al. | 204/159.22 |
| 4,357,456 | | 11/1982 | Lopez et al. | 528/111.5 |
| 4,690,987 | * | 9/1987 | Sakakibara et al. | 525/502 |
| 5,470,689 | * | 11/1995 | Wolf et al. | 430/269 |
| 5,501,942 | * | 3/1996 | Salvin et al. | 430/280.1 |

FOREIGN PATENT DOCUMENTS

| | | | |
|---|---|---|---|
| 2097022-A | * | 11/1993 | (CA) . |
| 2097022-A1 | * | 11/1993 | (CA) . |
| 4109048-A | * | 9/1992 | (DE) . |
| 4109048-A1 | * | 9/1992 | (DE) . |

* cited by examiner

*Primary Examiner*—Robert E. L. Sellers
(74) *Attorney, Agent, or Firm*—Joseph C. Gil; Thomas W. Roy

(57) ABSTRACT

The present invention relates epoxy(meth)acrylates which are substantially free from epoxide groups and are the reaction products of organic compounds containing epoxide groups and having a number average molecular weight ($M_n$) of 130 to 1000 with I) compounds containing carboxyl and ester groups at an equivalent ratio of carboxyl groups to epoxide groups of 0.7:1.0 to 1.0:1.0, wherein compounds I) are reaction products of
   A) organic dicarboxylic acids or dicarboxylic acid anhydrides having a molecular weight of 98 to 164 with
   B) reaction products containing alcoholic hydroxyl groups and prepared at a COOH/OH equivalent ratio of 0.6 to 0.95 from
      a) (meth)acrylic acid and
      b) tri- or tetrahydric ether alcohols having a molecular weight of 180 to 1000, which contain at least two ethylene oxide units —$CH_2$—$CH_2$—O— as part of one or more ether structures and which contain up to 20 mole %, based on the total moles of alkylene oxide units, of propylene oxide units, —$CH_2$—CH($CH_3$)—O—, and II) basic nitrogen compounds selected from ammonia and (cyclo)aliphatic primary and secondary mines at an NH/epoxide equivalent ratio of 0:1.0 to 0.3:1.0.

The present invention also relates to a process for preparing these epoxy(meth)acrylates and to their use in radically hardenable coating, putties or sealing compositions, or for the production of moldings.

9 Claims, No Drawings

EPOXY(METH)ACRYLATES, A PROCESS FOR THEIR PRODUCTION AND THEIR USE AS BINDERS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to new epoxy(meth) acrylates, to a process for their production, and to their use as radically hardenable binders for the production of coating compositions, putties and sealing compositions, or for the production of moldings.

2. Description of the Prior Art

The term "epoxy(meth)acrylates" refers to derivatives of epoxy resins which are substantially free from epoxy groups and which contain acrylate or methacrylate groups.

Epoxy(meth)acrylates are prepared by the reaction of an epoxide resin, such as bisphenol A diglycidyl ether, with (meth)acrylic acid in the presence of catalysts (e.g. DE-A 2,349,979) and may be optionally modified by reaction with other reactants. Epoxy(meth)acrylates, which are described, e.g., in DE-A 2,429,527, 4,217,761, 4,109,048 and 3,519, 117, are normally highly viscous substances that are dissolved in low molecular weight monomers or solvents to convert them into a processable state.

An underlying object of the present invention is to provide new epoxy(meth)acrylates that have a viscosity which is sufficiently low for them to be processed free from monomers and solvents, but that can nevertheless be used to produce high-quality coating compositions, sealing compositions or moldings.

This object can be achieved by the epoxy(meth)acrylates according to the invention and the method for their production.

SUMMARY OF THE INVENTION

The present invention relates epoxy(meth)acrylates which are substantially free from epoxide groups and are the reaction products of organic compounds containing epoxide groups and having a number average molecular weight ($M_n$) of 130 to 1000 with I) compounds containing carboxyl and ester groups at an equivalent ratio of carboxyl groups to epoxide groups of 0.7:1.0 to 1.0:1.0, wherein compounds I) are reaction products of
   - A) organic dicarboxylic acids or dicarboxylic acid anhydrides having a molecular weight of 98 to 164 with
   - B) reaction products containing alcoholic hydroxyl groups and prepared at a COOH/OH equivalent ratio of 0.6 to 0.95 from
     - a) (meth)acrylic acid and
     - b) tri- or tetrahydric ether alcohols having a molecular weight of 180 to 1000, which contain at least two ethylene oxide units —$CH_2$—$CH_2$—O— as part of one or more ether structures and which contain up to 20 mole %, based on the total moles of alkylene oxide units, of propylene oxide units, —$CH_2$—CH($CH_3$)—O—, and II) basic nitrogen compounds selected from ammonia and (cyclo)aliphatic primary and secondary amines at an NH/epoxide equivalent ratio of 0:1.0 to 0.3:1.0.

The present invention also relates to a process for preparing these epoxy(meth)acrylates and to their use in radically hardenable coating, stopper or sealing compositions, or for the production of moldings.

DETAILED DESCRIPTION OF THE INVENTION

In accordance with the present invention, compounds containing epoxide groups are organic compounds having a number average molecular weight ($M_n$) of 130 to 1000 which contain an average of at least one, preferably 1.5 to 6 and most preferably 1.5 to 2 epoxide groups per molecule. One epoxide equivalent means the amount of an epoxide compound in grams which contains one mole of epoxide groups.

Preferred compounds containing epoxide groups have an epoxide equivalent weight of 100 to 500. Examples include polyglycidyl ethers of polyhydric phenols, such as catechol, resorcinol, hydroquinone, 4,4'-dihydroxy-diphenylmethane, 2,2-(4,4'-dihydroxydiphenyl)propane-(bisphenol A), 4,4'-dihydroxydiphenylcylohexane, 4,4'-dihydroxy-diphenylsulphone, tris-(4-hydroxyphenyl)-methane and Novolak resins (i.e. reaction products of mono- or polyhydric phenols with aldehydes, particularly formaldehyde, in the presence of acidic catalysts). Polyglycidyl ethers of bisphenol A are preferred.

Other suitable compounds containing epoxide groups include glycidyl ethers of monohydric alcohols such as n-butanol and 2-ethylhexanol; glycidyl ethers of polyhydric alcohols such as 1,3-butanediol, 1,4-butenediol, 1,6-hexanediol, glycerine, trimethylolpropane, pentaerythritol and polyethylene glycols; triglycidyl isocyanurate; polyglycidyl thioethers of polyvalent thiols such as bis-mercaptomethylbenzene; glycidyl esters of monocarboxylic acids such as versatic acid; and glycidyl esters of polyvalent aromatic, aliphatic and cycloaliphatic carboxylic acids such as phthalic acid diglycidyl ester, isophthalic acid diglycidyl ester, terephthalic acid diglycidyl ester, tetrahydrophthalic acid diglycidyl ester, adipic acid diglycidyl ester and hexahydrophthalic acid diglycidyl ester.

Compounds I), which contain carboxy and ester groups, are prepared by the reaction of A) organic dicarboxylic acids or dicarboxylic acid anhydrides having a molecular weight of 98 to 164 with
B) reaction products containing OH groups and prepared at a COOH/OH equivalent ratio of 0.6 to 0.95 from
   - a) (meth)acrylic acid and
   - b) tri- or tetrahydric ether alcohols having a molecular weight of 180 to 1000, which contain at least two ethylene oxide units, —$CH_2$—$CH_2$—O—, as part of an ether structure and which contain up to 20 mole %, based on the total moles of alkylene oxide units, of propylene oxide units, —$CH_2$—CH($CH_3$)—O—.

Reactants A) and B) are preferably used in amounts which correspond to a molar ratio of carboxyl groups of component A) to hydroxyl groups of component B) of 1.8:1.0 to 2.2:1.0, more preferably 1.9:1.0 to 2.1:1.0. In calculating these ratios one carboxylic acid anhydride group is equal to two carboxyl groups.

Dicarboxylic acids or dicarboxylic acid anhydrides A) are selected from saturated or unsaturated aliphatic dicarboxylic acids containing 4 to 10 carbon atoms such as fumaric acid, maleic acid, succinic acid, adipic acid, sebacic acid, itaconic acid and/or the corresponding anhydrides; cycloaliphatic dicarboxylic acids or dicarboxylic acid anhydrides containing 8 to 10 carbon atoms such as tetrahydrophthalic acid, hexahydrophthalic acid, norbornene dicarboxylic acid and/or anhydrides thereof; and aromatic dicarboxylic acids containing 8 carbon atoms or anhydrides thereof such as phthalic acid, phthalic acid anhydride, isophthalic acid and terephthalic acid.

Component B) is selected from reaction products containing OH groups and prepared at a COOH/OH equivalent ratio of 0.6 to 0.95, preferably 0.65 to 0.90, from a) (meth)acrylic acid (e.g. acrylic acid, methacrylic acid or mixtures of these acids) and b) tri- or tetrahydric alcohols having a molecular weight of 180 to 1000, which contain ether groups and which contain at least two ethylene oxide units, —$CH_2$—$CH_2$—O—, as part of an ether structure.

Ether alcohols b) may be obtained by the ethoxylation of suitable starter molecules in known manner. Examples of these starter molecules include tri- or tetrahydric alcohols which are free from ether groups, such as glycerine, trimethylolpropane, trimethylolethane, pentaerythritol, and mixtures thereof.

The ether alcohols preferably have a degree of ethoxylation of 2 to 20, more preferably 2 to 15. The degree of ethoxylation represents the average number of moles of ethylene oxide which have been added onto 1 mole of an alcohol starter molecule.

Alcohols b), which contain ether groups, may contain up to 20 mole % of propylene oxide units, —$CH_2$—CH($CH_3$)—O— (molar ratio of ethylene oxide to propylene oxide up to 4:1). Component b) preferably contains less than 10 mole % of propoxylation products.

The reaction of components a) and b) is carried out in known manner, e.g., by the azeotropic esterification of (meth)acrylic acid with ether alcohols. The conditions of the esterification reaction are generally maintained until the solvent-free esterification products haver an acid number of less than 10 mg KOH/g.

The reaction of components A) and B) to form compound I) is also carried out in known manner, e.g., by the melt esterification of dicarboxylic acids or dicarboxylic acid anhydrides A) with the OH groups of component B).

The reaction of epoxides with compounds I) is also known and described, e.g., in DE-A 2,429,527 and 2,534,012. It may be conducted in the absence of solvent or in a solvent. Examples of suitable solvents include inert solvents such as butyl acetate, toluene, cyclohexane and mixtures of these solvents, and copolymerizable monomers, which are described below. Preferably, no solvent or monomer is used.

The reaction of compounds I) with the compounds containing epoxide groups is conducted in the presence of about 0.01 to 3% by weight, based on the weight of the epoxide starting material, of catalysts such as amines, quaternary ammonium salts, alkali hydroxides, alkali salts of organic carboxylic acids, mercaptans, dialkyl sulphides, sulphonium or phosphonium compounds and phosphines. Quaternary ammonium salts such as triethylbenzylammonium chloride are preferably used.

The reaction is preferably conducted at about 40° to 90° C. In certain cases the temperature may be above or below this range. The reaction is conducted at an equivalent ratio of carboxyl groups of compounds I) to epoxide groups of 0.7:1.0 to 1.0:1.0, preferably 0.8:1.0 to 0.98:1.0. One equivalent of carboxyl groups corresponds to the amount of meth(acrylic) acid in grams which contains one mole of carboxyl groups.

Nitrogen compounds II), which are optionally used, are selected from ammonia and preferably (cyclo)aliphatic primary and/or secondary amines having a molecular weight of 31 to 300. Examples of primary amines include mono- and diamines such as methylamine, n-butylamine, n-hexylamine, 2-ethylhexylamine, cyclohexylamine, ethanolamine, benzylamine, ethylenediamine, the isomeric diaminobutanes, the isomeric diaminohexanes and 1,4-diaminocyclohexane. Examples of secondary amines include dimethylamine, diethylamine, diethanolamine, diiso-propanolamine, N-methylethanolamine and N-cyclohexylisopropylamine.

The reaction is conducted at an equivalent ratio of amino groups to epoxide groups of 0:1.0 to 0.3:1.0, preferably 0.02:1.0 to 0.2:1.0. One NH equivalent of a nitrogen compound is that amount which contains one gram atom of hydrogen bonded to a basic nitrogen.

The reaction of the epoxide groups with the nitrogen compounds may also be conducted in the absence of solvents or in the previously disclosed. The reaction temperature is preferably 40° to 90° C., but temperatures above or below this range may also be used in certain cases.

When carrying out the reaction, all the epoxide groups which are originally present are substantially reacted with compounds I) and II). The sum of the equivalents of the reactants to be used in steps I) and II) per equivalent of epoxide groups originally present is at least 1.0, preferably 1.0 to 1.1.

In order to protect the polymerizable reaction products according to the invention from undesirable premature polymerization, it is recommended that 0.001–0.2% by weight, based on the total weight of the reaction mixture including auxiliary materials and additives, of polymerization inhibitors or antioxidants (e.g. phenols and phenol derivatives, preferably sterically hindered phenols) are added during the preparation. Other suitable stabilizers are described in "Methoden der organischen Chemie" ["Methods of Organic Chemistry"] (Houben-Weyl), Fourth Edition, Volume XIV/1, pages 433–452, 756, Georg Thieme Verlag, Stuttgart 1961. 2,6-di-tert.-butyl-p-cresol, hydroquinone monomethyl ether and pheno-thiazine are very suitable examples.

The reaction products according to the invention may be used without the addition of copolymerizable monomers or solvents. They may optionally also be diluted with copolymerizable monomers or with inert solvents.

Examples of copolymerizable monomers include di- and polyacrylates and di- and polymethacrylates of glycols containing 2 to 6 C atoms and polyols containing 3–4 hydroxyl groups and 3 to 6 C atoms, such as ethylene glycol diacrylate, 1,3-propanediol diacrylate, 1,4-butanediol diacrylate, 1,6-hexanediol diacrylate, trimethylolpropane triacrylate, pentaerythritol tri- and tetraacrylate and the corresponding methacrylates, and also di(meth)acrylates of polyether glycols based on glycol, 1,3-propanediol or 1,4-butanediol, triacrylates of the reaction products of 1 mole of trimethylolpropane and 2.5 to 5 moles of ethylene oxide and/or propylene oxide, and tri- and tetraacrylates of the reaction products of 1 mole of pentaerythritol and 3 to 6 moles of ethylene oxide and/or propylene oxide. Examples of other copolymerizable monomers include aromatic vinyl compounds such as styrene, vinyl alkyl ethers such as vinyl butyl ether, triethylene glycol divinyl ethers and allyl compounds such as triallyl isocyanurate.

Solvents such as acetone, methyl ethyl ketone or cyclohexanone may also be used as diluents during the reaction or thereafter.

The products according to the invention, or mixtures thereof with other copolymerizable monomers, constitute valuable systems which can be hardened by means of high-energy radiation, e.g. UV light, electron beams or gamma rays. Hardening may also be effected in the presence of substances acting as radical donors, such as (hydro) peroxides, optionally in the presence of accelerators.

The reaction products according to the invention are preferably used as coating compositions or for the production of coating compositions which can be hardened by UV light. Their particular advantage is that they harden in a very short time in the presence of atmospheric oxygen and photoinitiators, for example.

Suitable photoinitiators are known and include those described in "Methoden der organischen Chemie" (Houben-Weyl), Volume E20 page 80 et seq., Georg Thieme Verlag, Stuttgart 1987. Examples of preferred photoinitiators include benzoin ethers such as benzoin isopropyl ether, benzil ketals such as benzil dimethyl ketal, and hydroxyalkyl phenones such as 1-phenyl-2-hydroxy-2-methylpropane-1-one, benzophenone, and derivatives thereof.

The photoinitiators, which are used in amounts of 0.1 to 10% by weight, preferably 0.1 to 5% by weight, based on the weight of the reaction products according to the invention and the copolymerizable monomers which are optionally added, may be used individually or in combination with each other, depending on the purpose of use.

The products according to the invention are most preferably used as binders for coating compositions suitable for coating very different substrates, e.g. paper, cardboard, leather, wood, plastics, nonwoven fabric, textiles, ceramic materials, paper provided with a photographic layer and as binders for molding compositions. In addition, the products according to the invention may be used as binders for radically hardening known putties or sealing compositions.

The invention is further illustrated but is not intended to be limited by the following examples in which all parts and percentages are by weight unless otherwise specified.

EXAMPLES

Components B) containing OH groups

The amounts of raw materials set forth in Table 1 were dissolved, together with 1.5% of p-toluenesulphonic acid, 0.3% of p-methoxyphenol and 0.02% of 2,5-di-tert.-butyl hydroquinone, based on the total weight of a) and b) in each case, in cyclohexane to form a 70% solution. The resulting mixture was heated to the reflux temperature with stirring and while passing air through. The mixture was maintained under vigorous reflux until an acid number less than 5 (mg KOH/g substance) was obtained. After cooling to 50° C., a vacuum was applied and the cyclohexane was distilled off.

TABLE 1

| Component B) | B1 | B2 | B3 |
|---|---|---|---|
| Starting materials (moles) | | | |
| acrylic acid (component a) | 2.0 | 2.6 | 2.6 |
| component b) | | | |
| trimethylolpropane ethoxylated 12 times | 1.0 | | |
| trimethylolpropane ethoxylated 4 times | | 1.0 | |
| trimethylolpropane propoxylated 3 times | | | 1.0 |
| acid number (mg KOH/g substance) | 4.5 | 4.5 | 3.5 |
| viscosity (mpa · s/23° C.) | 180 | 140 | 145 |

EXAMPLES 1–3 AND COMPARISON EXAMPLE 4

The amounts of component A) and component B) set forth in Table 2 were heated to 60° C. with stirring and while passing air through and maintained at this temperature for 4 hours. The products formed (components I) were not isolated, but were reacted with epoxide at 60° C. after the addition of 0.1% of di-tert.-butyl-p-cresol and 0.5% of triethylbenzylammonium chloride. For this purpose, the amount of epoxide set forth in Table 2 was added over 1 hour. The mixture was then stirred at 80° C. until an acid number <6 (mg KOH/substance) was obtained. The amount of amine (component II) set forth in Table 2 was then added such that the temperature remained constant. After stirring for a further 3 hours at 80° C., a content of epoxide acid of <0.3% was found, and the mixture was cooled.

The component B) used in Comparison example 4 was prepared using an ether alcohol that is not according to the invention, i.e., propoxylated trimethylolpropane.

TABLE 2

| | Examples | | | Comparison Example |
|---|---|---|---|---|
| | 1 | 2 | 3 | 4 |
| Starting materials (equivalents) | | | | |
| component I | | | | |
| component A | | | | |
| maleic anhydride | 1.0 | | 0.45 | 0.45 |
| phthalic anhydride | | 0.45 | | |
| component B | | | | |
| B1 | 1.0 | | | |
| B2 | | 1.0 | 1.0 | |
| B3 | | | | 1.0 |
| bisphenol A glycidyl ether (epoxide equivalent: 190) | 1.1 | 0.55 | 0.55 | 0.55 |
| component II | | | | |
| diethanolamine | 0.15 | 0.15 | 0.15 | 0.15 |
| viscosity (mPa · s/23° C.) | 59200 | 15000 | 12000 | 2000 |

EXAMPLES OF USE

The products of Examples 1 to 3 according to the invention and Comparison Example 4 were each mixed with 5% of 1-phenyl-2-hydroxy-2-methylpropane-1-one. After applying the coatings to cardboard (15 $\mu$m application thickness) they were passed under a Hanovia radiation emitter (80 W/cm, distance 10 cm). At a belt speed of at least 30 m/min, solvent- and scratch-resistant coatings were obtained from the examples according to the invention, but not from Comparison Example 4.

In this situation, the term "solvent-resistant" means that the coating still appeared perfect after at least 20 double rubs of a cloth saturated in butyl acetate under a loading of 1 kg.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An epoxy(meth)acrylate which is substantially free from epoxide groups and is the reaction product of an organic compound containing epoxide groups and having a number average molecular weight ($M_n$) of 130 to 1000 with I) a compound containing carboxyl and ester groups at an equivalent ratio of carboxyl groups to epoxide groups of 0.7:1.0 to 1.0:1.0, wherein compound I) is the reaction product of A) an organic dicarboxylic acid or dicarboxylic acid anhydride having a molecular weight of 98 to 164 *or a member slected from the group consisting of sebacic acid anhydride, tetrahydrophthalic acid, hexahydrophthalic acid, norbornene dicarboxylic acid, norbornene dicarboxylic acid anhydride, phthalic acid, isophthalic acid and terephthalic acid,* with B) a reaction product containing alcoholic hydroxyl groups and prepared at a COOH/OH equivalent ratio of [0.6] *6.0:1* to [0.95] *0.95:1* from a) (meth)acrylic acid and b) a tri- or tetrahydric ether alcohol having a molecular weight of 180 to 1000, which contains at least two ethylene oxide units —$CH_2$—$CH_2$—O— as part of one or more ether structures and which contains up to 20 mole %, based on the total moles of alkylene oxide units, of propylene oxide units, —$CH_2$—CH($CH_3$)—O—, and II) a basic nitrogen compound selected from ammonia and (cyclo)aliphatic primary and secondary amines at an NH/epoxide equivalent ratio of 0:1.0 to 0.3:1.0.

2. The epoxy(meth)acrylate of claim 1 wherein the epoxy (meth)acrylate is the reaction product of said organic compound containing epoxide groups with compound I) at an equivalent ratio of carboxyl groups to epoxide groups of 0.8:1.0 to 0.98:1.0 and with basic nitrogen compound II at an NH/epoxide equivalent ratio of 0.02:1.0 to 0.2:1.0.

3. The epoxy(meth)acrylate of claim 2 wherein said tri- or tetrahydric ether alcohol contains 2 to 20 ethylene oxide units.

4. The epoxy(meth)acrylate of claim 1 wherein said tri- or tetrahydric ether alcohol contains 2 to 20 ethylene oxide units.

5. A binder-containing, radically hardening composition wherein the binder comprises the epoxy(meth)acrylates of claim 1.

6. A process for preparing an epoxy(meth)acrylate, which is substantially free from epoxide groups, which comprises reacting an organic compound containing epoxide groups and having a number average molecular weight ($M_n$) of 130 to 1000 with I) a compound containing carboxyl and ester groups at an equivalent ratio of carboxyl groups to epoxide groups of 0.7:1.0 to 1.0:1.0, wherein compound I) is the reaction product of A) an organic dicarboxylic acid or dicarboxylic acid anhydride having a molecular weight of 98 to 164 *or a member slected from the group consisting of sebacic acid anhydride, tetrahydrophthalic acid, hexahydrophthalic acid, norbornene dicarboxylic acid, norbornene dicarboxylic acid anhydride, phthalic acid, isophthalic acid and terephthalic acid,* with B) a reaction product containing alcoholic hydroxyl groups and prepared at a COOH/OH equivalent ratio of [0.6] *0.6:1* to [0.95] *0.95:1* from a) (meth)acrylic acid and b) a tri- or tetrahydric ether alcohol having a molecular weight of 180 to 1000, which contains at least two ethylene oxide units —$CH_2$—$CH_2$—O— part of one or more ether structures and which contains up to 20 mole %, based on the total moles of alkylene oxide units, of propylene oxide units, —$CH_2$—CH($CH_3$)—O—, and II) a basic nitrogen compound selected from ammonia and (cyclo)aliphatic primary and secondary amines at an NH/epoxide equivalent ratio of 0:1.0 to 0.3:1.0.

7. The process of claim 6 wherein said tri- or tetrahydric ether alcohol contains 2 to 20 ethylene oxide units.

8. The process of claim [2] *6* wherein the epoxy(meth) acrylate is the reaction product of said organic compound containing epoxide groups with compound I) at an equivalent ratio of carboxyl groups to epoxide groups of 0.8:1.0 to 0.98:1.0 and with basic nitrogen compound II at an NH/epoxide equivalent ratio of 0.02:1.0 to 0.2:1.0.

9. The process of claim 8 wherein said tri- or tetrahydric ether alcohol contains 2 to 20 ethylene oxide units.

* * * * *